US011775918B2

(12) United States Patent
Rakshit et al.

(10) Patent No.: US 11,775,918 B2
(45) Date of Patent: Oct. 3, 2023

(54) ANALYSIS OF HANDLING PARAMETERS FOR TRANSPORTING SENSITIVE ITEMS USING ARTIFICIAL INTELLIGENCE

(71) Applicant: INTERNATIONAL BUSINESS MACHINES CORPORATION, Armonk, NY (US)

(72) Inventors: Sarbajit K. Rakshit, Kolkata (IN); Sathya Santhar, Ramapuram (IN); Sandip Goswami, Kolkata (IN); Raghuveer Prasad Nagar, Kota (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/469,153

(22) Filed: Sep. 8, 2021

(65) Prior Publication Data

US 2023/0069834 A1 Mar. 9, 2023

(51) Int. Cl.
*G06Q 10/0832* (2023.01)
*G16Y 20/20* (2020.01)

(52) U.S. Cl.
CPC .......... *G06Q 10/0832* (2013.01); *G16Y 20/20* (2020.01)

(58) Field of Classification Search
CPC .......................... G06Q 10/0833; G06Q 50/30
USPC ....................................................... 705/332
See application file for complete search history.

(56) References Cited

U.S. PATENT DOCUMENTS

| 10,627,244 | B1* | 4/2020 | Lauka | G06Q 10/08355 |
| 2003/0121839 | A1* | 7/2003 | Ryan, Jr. | B07C 1/00 |
| | | | | 209/584 |
| 2004/0148052 | A1* | 7/2004 | Ferguson | G06Q 10/08 |
| | | | | 700/213 |
| 2005/0038685 | A1* | 2/2005 | Collins | G06Q 10/06398 |
| | | | | 705/332 |

(Continued)

FOREIGN PATENT DOCUMENTS

| CN | 112330345 A | * 2/2021 |
| IN | 202111003926 A | 2/2021 |

OTHER PUBLICATIONS

"Weaving the Wireless Web: Toward a Low-Power, Dense Wireless Sensor Network for the Industrial IoT." J. M. Williams et al. Oct. 10, 2017. IEEE Microwave Magazine, vol. 18, No. 7, pp. 40-63. (Year: 2017).*

(Continued)

*Primary Examiner* — Jeff Zimmerman
*Assistant Examiner* — Hunter A Molnar
(74) *Attorney, Agent, or Firm* — Tutunjian & Bitetto, P.C.; Michael A. Petrocelli

(57) ABSTRACT

Propagation of pathogens is reduced by configuring internet of things (IoT) sensors along a supply chain of package; and analyzing the packages in the supply chain using the IoT sensors to determine handling requirements of products. The packages can be tracked with a package handling confirmation engine including a Region Based Convolutional Neural Network (RCNN) to determine with the IoT sensors measuring interactions with the packages that parties in the supply chain are handling the packages in accordance with the handling requirements. Product distribution can be stopped through the supply chain in response to the interactions with the packages failing to meet the handling requirements.

20 Claims, 7 Drawing Sheets

(56) References Cited

U.S. PATENT DOCUMENTS

| | | | | |
|---|---|---|---|---|
| 2007/0231188 A1* | 10/2007 | Jung | ............ | A61L 2/28 |
| | | | | 422/1 |
| 2015/0235170 A1* | 8/2015 | Mallers | ............ | G06Q 10/0832 |
| | | | | 705/332 |
| 2018/0174097 A1* | 6/2018 | Liu | ............ | G06Q 10/0833 |
| 2018/0189716 A1* | 7/2018 | Crone | ............ | G06Q 10/083 |
| 2019/0204317 A1 | 7/2019 | Amini et al. | | |
| 2020/0125888 A1* | 4/2020 | Hacker | ............ | G06K 9/627 |
| 2021/0077709 A1 | 3/2021 | Ben-David et al. | | |
| 2022/0084186 A1* | 3/2022 | Ivens | ............ | G06V 10/242 |

OTHER PUBLICATIONS

Mell, Peter, et al., "The NIST Definition of Cloud Computing," Sep. 2011, 7 pages.

Anonymous, "Auto Defect and Sanitize Objects (equipment's, vehicles, food items etc)" https://ip.com/IPCOM/000263146, Aug. 2020, 4 pages.

* cited by examiner

```
                    ┌─────────┐
                    │  Start  │
                    └────┬────┘
                         ▼
┌──────────────────────────────────────────────────────────┐  1
│      Registration of participants of shipping chain.     │
└──────────────────────────┬───────────────────────────────┘
                           ▼
┌──────────────────────────────────────────────────────────┐  2
│ Equipping facilities along the supply chain with internet│
│ of things (IOT) sensors that provide data that can be    │
│ used to track the movement, and handling of the product. │
└──────────────────────────┬───────────────────────────────┘
                           ▼
┌──────────────────────────────────────────────────────────┐  3
│ The packages are tracked using IoT sensors, which can be │
│ integrated into the packages themselves, as well as being│
│ integrated into the environments at which the packages   │
│ are being handled in the shipping chain.                 │
└──────────────────────────┬───────────────────────────────┘
                           ▼
┌──────────────────────────────────────────────────────────┐  4
│  Classifying the packages according to their handling    │
│  requirements.                                           │
└──────────────────────────┬───────────────────────────────┘
                           ▼
┌──────────────────────────────────────────────────────────┐  5
│ The packages are tracked using IoT sensors to determine  │
│ if handling requirements are met through shipping chain. │
└──────────────────────────┬───────────────────────────────┘
                           ▼
┌──────────────────────────────────────────────────────────┐  6
│ Inform parties within shipping chain of packages that    │
│ have not been handled in accordance with requirements to │
│ stop the spread of pathogens.                            │
└──────────────────────────┬───────────────────────────────┘
                           ▼
                    ┌─────────┐
                    │   END   │
                    └─────────┘
```

FIG. 2

ANALYSIS OF HANDLING PARAMETERS FOR TRANSPORTING SENSITIVE ITEMS USING ARTIFICIAL INTELLIGENCE

BACKGROUND

The present disclosure generally relates to computer analysis of transporting methods for items, and more particularly to artificial intelligence enabled analysis of transporting methods in relation to sensitivities of items shipped, including contamination of the items.

When customer orders any product from online shopping portal, then product is delivered through appropriate supply chain route/stages. For example, either the product is to be manufactured for delivery or needs to be assembled for delivery of the product is already available for delivery. That is, before the product is delivered to customer location, the product is handled in multiple places, either by an automated machine, or by human.

Preventing contamination spreading is one of the major activities while delivering the product to customer location. Contamination can spread through droplet, touch, or in contact with contaminated fluid, gas etc. Novel Coronavirus is the latest global threat we have come across. Similarly, there can be different types of pathogens which can come in contact with packages as they are being delivered to a customer location.

SUMMARY

In accordance with one aspect of the present disclosure, a method for preventing cross-propagation of pathogens is described that includes configuring internet of things (IoT) sensors along a supply chain of package. Analyzing the packages in the supply chain using the IoT sensors to determine handling requirements of the products within the package. Tracking the packages with a package handling confirmation engine including a Region Based Convolutional Neural Network (RCNN) to determine with the IoT sensors measuring interactions with the packages that parties in the supply chain are handling the packages in accordance with the handling requirements. The method may further include stopping product distribution through the supply chain in response to the interactions with the packages failing to meet the handling requirements.

In another aspect, a system is described for preventing propagation of pathogens. In one embodiment, the system may include a hardware processor; and a memory that stores a computer program product. The computer program product when executed by the hardware processor, causes the hardware processor to configure internet of things (IoT) sensors along a supply chain of package, and analyze packages in the supply chain using the IoT sensors to determine handling requirements of the products within the package. The system may also include instructions to provide that the hardware processor track the packages with a package handling confirmation engine including a Region Based Convolutional Neural Network (RCNN) to determine with the IoT sensors that are measuring interactions with the packages that the parties in the supply chain are handling the packages in accordance with the handling requirements. The system may further stop product distribution through the supply chain in response to the interactions with the packages failing to meet the handling requirements.

In another aspect, a computer program product for preventing propagation of pathogens comprising a computer readable storage medium having computer readable program code embodied therewith, the program instructions executable by a processor to cause the processor to configure internet of things (IoT) sensors along a supply chain of package, and analyze packages in the supply chain using the IoT sensors to determine handling requirements of the products within the package. The computer program product may also include instructions to provide that the hardware processor track the packages with a package handling confirmation engine including a Region Based Convolutional Neural Network (RCNN) to determine with the IoT sensors that are measuring interactions with the packages that the parties in the supply chain are handling the packages in accordance with the handling requirements. The computer program product can further stop product distribution through the supply chain in response to the interactions with the packages failing to meet the handling requirements.

BRIEF DESCRIPTION OF THE DRAWINGS

The following description will provide details of preferred embodiments with reference to the following figures wherein:

FIG. 2 is a flow/block diagram showing one embodiment a method for preventing cross contamination and/or propagation of pathogens during package delivery, in accordance with some embodiments of the present disclosure.

DETAILED DESCRIPTION

The methods, systems, and computer program products described herein relate to methods and systems for preventing cross contamination or propagation of pathogen with package delivery. Contamination by virus, bacteria, fungal infection etc. can spread, i.e., be transmitted, during human or machine touch, human droplet, or if the product is travelled through contaminated area or placed in the contaminated location. For example, when a motherboard of a laptop is contaminated, the contamination can spread from the laptop manufacturing location to distributor to seller to customer. In another example, if the delivery person is infected, because of his sneezing, the to-be-delivered-product may get contaminated. When a food item is delivered with a book, but the food item is spoiled and leaking, or fume is coming out from the spoiled food item, it may contaminate the book, and that, in turn can contaminate the people reading the book.

The methods, systems and computer program products that are describe herein can provide a way by which cross contamination can be prevented across the supply chain, and contamination free products only can move across the supply chain until product is delivered to customer. Disclosed is an artificial intelligence (AI), blockchain memory and internet of things (IoT) based system and method to predict the contamination of the products at various handing stages in the supply chain until the delivery to the customer, and then dynamically derive and execute appropriate prevention steps for preventing the cross-contamination in the supply chain. The methods, systems and computer program products are now described in greater detail with reference to FIGS. 1-7.

Figure 1:
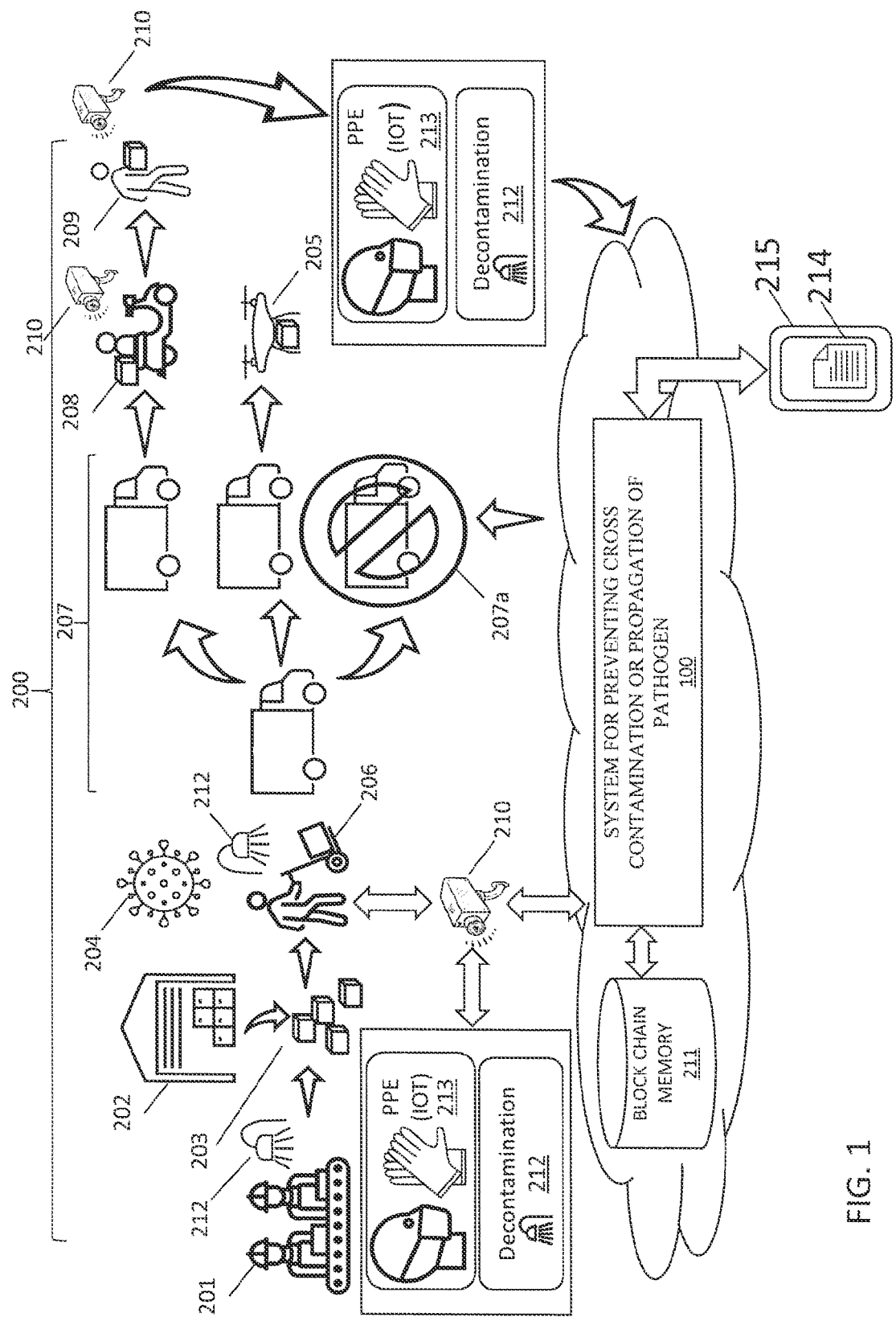
FIG. 1 is an illustration of an example environment, in which the systems and methods of the present disclosure can prevent cross contamination and/or propagation of pathogens during package delivery, in accordance with some embodiments of the present disclosure.
Figure 3:
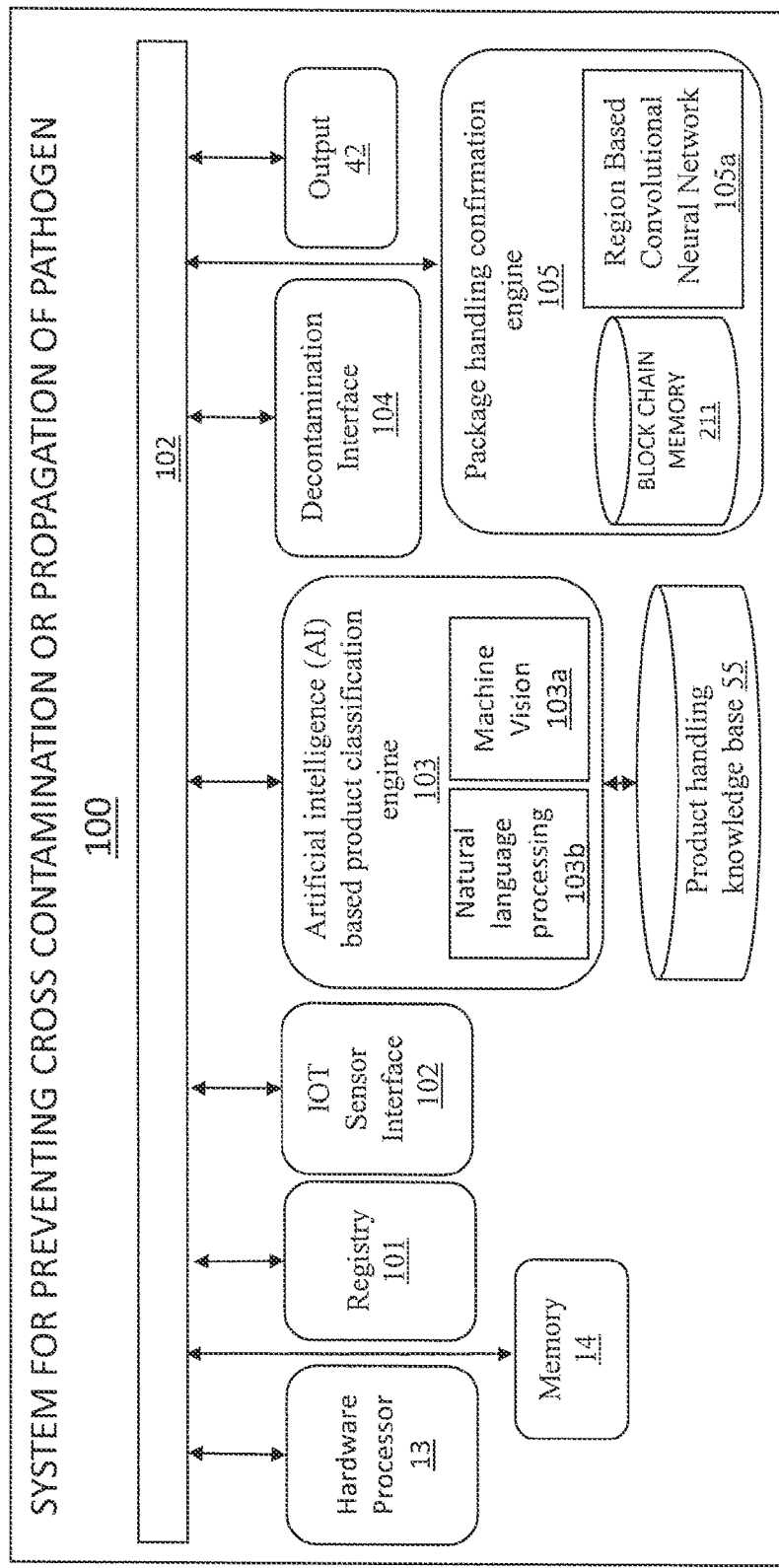
FIG. 3 is an illustration depicting one embodiment of a system for preventing cross contamination and/or propagation of pathogens during package delivery, in accordance with some embodiments of the present disclosure.

FIG. 1 is an illustration of an example environment, in which the systems and methods of the present disclosure can prevent cross contamination and/or propagation of pathogens during package delivery. FIG. 2 is a flow/block diagram showing one embodiment a method for preventing cross contamination and/or propagation of pathogens during package delivery. FIG. 3 is an illustration of a block diagram depicting one embodiment of a system for preventing cross contamination and/or propagation of pathogens during package delivery.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is an illustration of an example environment, in which the systems and methods of the present disclosure can prevent cross contamination and/or propagation of pathogens during package delivery. The term "pathogen" can be a bacterium, virus, or other microorganism that can cause disease. In some embodiments, the systems and methods can be employed to decrease the spread of COVID-19. Coronavirus disease 2019 (COVID-19) is a contagious disease caused by severe acute respiratory syndrome coronavirus 2 (SARS-CoV-2)(virus). The disclosed system and method predict the contamination based on the following factors, such as resources, weather and environment, and regions. "Resources" refers to who have handled the product and product components, including both human and machine and any material handling device like conveyor, drone, truck etc. "Weather and Environment" is a measurement of the temperature, humidity, and all the other ambient factors. "Regions" may refer to where the product and components go through.

The disclosed system and method recommend the prevention steps that can include:
1) Putting product movement on hold, or stopping the product movement;
2) Route change for the upcoming product movements; and
3) Decontamination, as an additional stage in the supply chain.

FIG. 1 is an illustration of an example environment, in which the systems and methods of the present disclosure can prevent cross contamination and/or propagation of pathogens during package delivery. The system 100 for preventing cross-contamination or propagation of pathogen with package delivery may be an artificial intelligence (AI), Blockchain and IoT based system and method to predict the contamination of the products at various handing stages in the supply chain until the delivery to the customer, and then dynamically derive and execute appropriate prevention steps for preventing the cross-contamination in the supply chain.

The disclosed system and method recommend the prevention steps like
1. Putting product movement on hold, or stopping the product movement
2. Route change for the upcoming product movements
3. Decontamination, as an additional stage in the supply chain The method for preventing cross-contamination or propagation includes that if any package that is to be delivered is recognized or predicted to be contaminated, and if appropriate decontamination steps or cross contamination prevention steps are not applied, then the proposed system will be applying appropriate lock on the impacted product/component of product/material handling system (e.g. conveyor) partially or completely, so that the human or machine will not be allowed to handle the product in any product handling node, and will be preventing cross contamination.

For example, FIG. 1 illustrates one example of an example environment including a supply chain 200. The supply chain may include manufacturing 201 and storage 202 for product 203. The supply chain 200 may further include a distribution point 206 at which the product is loaded from manufacturing 201 and/or storage 202 into a long distance shipping vehicle 207, such as a truck. Although FIG. 1 illustrates that the long distance shipping vehicle 207 is a truck, it is not intended that the present disclosure be limited to only this type of vehicle, as aircraft and trains are also suitable shipping vehicles. Long distance refers to distances in travel that would typically include highway passage when over roadways. Moving product from one town to an adjacent town is an example of long distance shipping. More particularly, this type of loading at the distribution point 206 is particularly for loading a plurality of packages, i.e., packages of product 203, into a shipping vehicle having a destination, such as a town and/or county, at which the plurality of packages can be individually distributed to their specific delivery address. Once, the shipping vehicle 207 reaches their destination, the product 203 can be redistributed for shipping to the individual address, which is their shipping destination. In the example, two local shipment routes are depicted. One of the local shipping routes is by manned delivery, e.g., people delivering the goods. A first stage of the manned delivery may be motorized man deliver 208. This can be followed by personal delivery 209. The second shipping route can be by machine, e.g., a drone 205 type delivery. It is noted that the shipping routes depicted in FIG. 1 are only examples, and it is not intended that the present disclosure be limited to only these examples.

The manufacturing 201 can be any facility or grouping of equipment for producing the product 203. The product 203 being delivered through the shipping routes 200 may be any type of goods. For example, the product 203 can be an electrical component, e.g., motherboard of a computer. The product 203 can also be food item. It is noted that these are only two examples of the types of products that can be tracked through the supply chain 200.

A system 100 is configured for preventing cross-contamination or propagation of pathogen with package delivery in accordance with the products 203 being tracked through the supply chain 200. The system 100 may include artificial intelligence (AI), Blockchain memory 211 and IoT based system 210 and can employ a method to predict the contamination of the products at various handing stages in the supply chain 200 until the delivery to the customer, and then dynamically derive and execute appropriate prevention steps for preventing the cross-contamination in the supply chain.

Any goods that are produced in one location and delivered to a second location may be tracked using the methods and systems of the present disclosure. The products 203 are tracked to determine whether the products 203 are contaminated, e.g., have come in contact with a pathogen 204, and/or likely to be contaminated, and whether they have been treated for decontamination and/or to stop the spread of the pathogen 204. Tracking can include a plurality of sensors and/or cameras 210 positioned along the supply chain 200 to track the products 203, and measure interaction with products 203 that can spreads pathogens 204 Decontamination 212 can include ultrasound or infrared or any chemical process that can kill pathogens. Cross contamination prevention steps can include users, e.g., human users, not using an internet of things (IoT) enabled mask or gloves 213 while handling of the product (PPE).

In one example, if IoT enabled systems, such as systems in communication with the IOT enabled masks or gloves, predicts that any product 203 is loaded on the delivery vehicle 207 is cross-contaminated, then the delivery vehicle 207a will not start. In one example, the IoT enabled system for preventing cross-contamination or propagation of pathogen with package delivery can send a signal to the vehicle engine (of the delivery vehicle 207a to be stopped) that either one or more loaded delivery product 203 is contaminated, or vehicle body is contaminated and accordingly the engine will not be starting. This example is not limited to surface transportation. If contamination is measured for a package that is to be delivered using automated systems, e.g., robot and/or drone 205, then the system 100 will recognize the package and will not be loading any package which is predicted as possible contaminated or will not be picking by the automated system.

Still referring to FIG. 1, in some embodiments, if the system 100 predicts appropriate decontamination steps is applied on the loaded product, then the vehicle will be allowed to start, and IoT enabled smart city will be recommending appropriate contamination free route (for truck or drone), so that during transportation, the vehicle or delivery products are not contaminated. Decontamination 212 can include ultrasound or infrared or any chemical process that can kill pathogens. The smart city can publish the geofencing boundary of containment zone restricted zone etc. and accordingly the proposed system will be planning for route.

Smart Contract rule for decontamination will be validating the IoT feed 210 to identify appropriate decontamination steps are applied on the product is being delivered or product handling device etc, and accordingly ledger will be ensuring product is being delivered is contamination free in every handling node. For different types of contamination needs different types of decontamination step, spoiled food-based contamination vs COVID-19 contamination.

Still referring to FIG. 1, in some embodiments, the system 100 for preventing cross-contamination or propagation of pathogen 204 with package delivery employs blockchain 211 and IoT 210 enabled systems (e.g. associated to product package, product handling module, either human or machine etc.) for tracking how any product 203 or components of products 203 are handled at different product produce handling nodes (like assembling, packaging, transporting etc). Accordingly, the system 100 can identify in which step of the activity needs decontamination procedure so that while delivering the product to the customer, the proposed system can ensure a contamination free product and also package is delivered to customer.

While waiting to receive a product through the supply chain 200, the customer (i.e., customer awaiting the product 203) can visualize if the product 203 is to be received is contamination free, or is possibly contaminated because of improper handling. In some embodiments, the user, i.e., customer for product being shipped, can receive from the system 100 a notice 214 including tracking number for the shipment of the product, with indications validating the progress of the product 203 through the supply chain 200 in blockchain to identify if the product that is being received is contamination free, i.e., free of pathogens 204. The notice 214 may be sent from the system 100 to a mobile computing device 215 of the user, in which the notice is displayed on a display screen of the mobile computing device 215. In some examples, the mobile computing device 215 may be a smart phone, tablet computer, laptop computer, etc. It is not required that the mobile computing device 215 be a mobile device, as desktop type devices are also applicable for displaying the notice 214.

In embodiments, in which the products 203 are to be received with an automated method (like robot will be dropping the product to customer house when customer is not present, or drone based delivery), then the automated receiving unit will be validating if the product is to be received is contamination free, otherwise the product will not be received by the order receiving unit.

In some embodiments, the workers handling the products in different handling node of the supply chain 200, can wear Augmented Reality glass, and accordingly the AR glass can recognize the unique identifier of the product 203 can visualize while product or handling device is contaminated.

FIG. 2 is a flow/block diagram showing one embodiment a method for preventing cross contamination and/or propagation of pathogens during package delivery, in accordance with some embodiments of the present disclosure. In some embodiments, the method can begin with, in response to receiving permission from a user for data collection, registering users with the system 100 for preventing cross-contamination or propagation of pathogen with package delivery. In some embodiments, the registration at block 1 can be performed once during the time at which the user registers for delivery service, such as during an initial purchase of the product 203.

To the extent that implementations of the system 100 for system 100 for preventing cross-contamination or propagation of pathogen with package delivery collect, store, or employ personal information provided by, or obtained from, individuals (for example, current locations of the user, historical word usage, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

FIG. 3 illustrates a system 100 for preventing cross-contamination or propagation of pathogen with package delivery. The system may include a registry 101 for users. The registry 101 includes an interface for receiving permissions for parties operating within the supply chain 200, as well as at least one form of memory for maintaining a database of registry information including what permissions have been granted and withdrawn. For example, the manufacturing unit 201, as well as the other supply chain participants, e.g., warehouse 202, sign up for the service, as the service requires monitoring resources and processes of the participants.

The method may continue with equipping facilities along the supply chain with internet of things (IOT) sensors 210, 213 that provide data that can be used to track the movement, and handling of the product 203 at block 2 of the method depicted in FIG. 2. By tracking the product 203, the system 100 is able determine whether an exposure with a pathogen 204 has occurred; whether the exposure results in a like transmission; and how the package is handled after potential exposure, including whether decontamination steps have occurred. Referring to FIGS. 1-3, the system 100 for preventing cross-contamination or propagation of pathogen with package delivery includes at least one interface 102 to the IOT sensors 210, 213. The interface may be wireless.

In some examples, the IOT sensors 210, 213 that can be used to track the packages 203 can include video/thermal camera. Monitoring cam done through cameras 210. Audio monitoring can be performed through microphone enabled devices. As will be discussed below, with audio monitoring, speech-to-text and natural language processing can be used to determine if there has been any contamination of package. In some examples, thermal cameras can detect human touch on any object. For example, when the object, such as a package 203, is touched, the human body temperature will be transmitted to the product (package 203). The transfer of temperature from the human body to the package can be identified with thermal camera. Further, when a human worker wears a mask, and hand gloves, then the IoT sensors 210, 213 will be able to identify if the worker has properly worn the nose mask and hand gloves. In some other embodiments, the product containers, e.g., packages 203, have sensor to track movement, or any other related properties like the application of pressure and/or changes in temperature.

As noted, the nose mask 213 also can have IoT sensor, and similarly, hand gloves 213 also can have IoT sensors. The nose mask and/or hand gloves with IoT sensors can generate self-power with piezoelectric crystals, while wearing, hand movement etc., these piezoelectric crystals will be generating self-power for the sensors. The mask and hand gloves 213 with the IoT sensors can be used to track the packages 203, as well as to track how the packages are being handled, etc. The mask and gloves 213 may be in communication with the system 100 for preventing cross-contamination or propagation of pathogen with package delivery via the IoT sensor interface 102 depicted in FIG. 3.

In some embodiments, the material handling equipment (MHEs) have sensors to identify if appropriate decontamination steps are applied at the loading areas (also referred to as gripping area). The decontamination steps can include chemical washes 212. The material handling system, machines etc., will include decontamination policies. For example, every day the material handling system should be decontaminated.

Referring to FIG. 2, in a following step at block 3, the packages 203 may be tracked using the IoT sensors 210, 213, which as noted above can be integrated into the packages 203 themselves, as well as being integrated (e.g., the use of IoT based cameras and sensors) into the environments at which the packages 203 are being handled in the supply chain 200.

Block 4 of the method depicted in FIG. 2 includes classifying the packages according to their handling requirements. The system 100 for preventing cross-contamination or propagation of pathogen with package delivery may employ deep learning that is applied to classify handling into proper/improper/double-check classes. Referring to FIG. 3, the system 100 for preventing cross-contamination or propagation of pathogen with package delivery includes product classification engine 103 that employs artificial intelligence to analyze the data collected from the IoT sensors 210, 213 and determine the types of products 203 that are being handled, and if any product can spoil, like food, chemical etc., and can contaminate. The system 100 for preventing cross-contamination or propagation of pathogen with package delivery has an interface having different types of sensors, like thermal sensor, smell sensor, proximity sensor, movement sensors etc.

For example, a video camera may take an image of a package having a description on it, or bar code, and the image is then analyzed by the includes product classification engine 103. The product classification engine 103 may employ artificial intelligence utilizing computer software programs that analyze the images using machine vision. Machine vision is a series of algorithms, or mathematical procedures, which work like a flow-chart or series of questions to compare the object seen with stored reference images of objects in different angles, positions and movements. Many other questions are possible, such as the degree to which the object is reflective, the degree to which it is steady or vibrating, and the smoothness with which it moves. Combining all of the values from the various questions, an overall ranking is derived which gives the A.I. the probability that an package 203 matches a package type stored in a product handling knowledge base 55. This type of A.I. is known as "rule-based". In some embodiments, the computer vision module 103a includes at least one hardware processor for executing a series of instructions for analyzing the images taken by the IoT sensor, and comparing the images to comparison objects from the data saved in an image database 55 correlating products to handling procedures.

In some embodiments, identifying products having handling procedures from packages using the IoT sensor may include extracting text from the packages 203 and analyzing the text using natural language processing. In some embodiments, the IoT sensors may include microphones. The microphones may capture verbal descriptions of the packages 203, which his then converted to text, and then analyzed using natural language processing. Natural language processing (NLP) is a subfield of computer science, information engineering, and artificial intelligence concerned with the interactions between computers and human (natural) languages, in particular how to program computers to process and analyze large amounts of natural language data. Natural language processing frequently involves, natural language understanding, and natural language generation. The data from the text correlating to the package is then compared to products within the product handling knowledge base 55. Matches result in a product having handling requirements that are needed to followed in order for the shipments to proceed through the supply chain 200.

Referring to FIG. 3, the system 100 for preventing cross-contamination or propagation of pathogen with package delivery includes product classification engine 103 that can include both the computer vision module 103a and the natural language processing module 103b. It is noted that computer vision and natural language processing are not the only mechanisms by which packages 203 being measured using IoT sensors are correlated to products. Any sensor for measuring a characteristic may be considered for determining the identity, i.e., type of product, that is being shipped in a package 203.

The handling knowledge base 55 may be a database of potential products to be shipped. The database may include instructions on how products are to be handled to ensure that pathogens are not transmitted during shipping. The handling knowledge base 55 may be a database that is stored in cloud memory. In some embodiments, the handling knowledge base 55 grows by including instructions for product handling from prior product analysis for products shipped through the supply chain 200, and tracked by the system. In some embodiments, the product classification engine may also include a web crawler. In scenarios in which the products corresponding to the packages 203 being tracked by the IOT sensors are identified, but do not match a matching product in the handling knowledge base 55, the web crawler may be used to retrieve product handling instructions from data on the internet.

The material handling equipment (MHEs), e.g., decontamination 212, are then enabled to perform different types of decontamination steps like ultrasound decontamination, infrared, warm air, chemical cleaning etc. Decontamination 212 can also include simple proper handling, e.g., gloves and face masks 213. The IoT enabled system will be tracking how the handling machine is touching different portions, and accordingly, the system can identify if any area is contaminated.

Referring to FIG. 2, the method may continue with the system using the IoT sensors 210, 213 to determine whether the packages 203 are being handled in accordance with their handling requirements. More specifically, block 5 of FIG. 2 includes the packages being tracked using IoT sensors to determine if handling requirements are met through supply chain 200. In some examples, R-CNN (Region Based Convolutional Neural Network) based analysis is performed to detect touched areas of the packages 203. Region Based Convolutional Neural Networks are a family of machine learning models for computer vision and specifically object detection.

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

In machine learning, a convolutional neural network (CNN) is a type of artificial neural network in which the connectivity pattern between its nodes (neurons) is inspired by the organization of the animal visual cortex, whose individual neurons are arranged to respond to overlapping regions tiling a visual field. Convolutional networks mimic biological processes and are configured as variations of multilayer perceptrons designed to use minimal amounts of preprocessing while processing data, such as digital images. A region-based convolutional neural network (RCNN) is a CNN that has been trained to identify regions of digital image data where an object of interest might be present with a certain degree of certainty (or a certain level of confidence).

Still referring to FIG. 2, at block 5, the systems determines whether the package is being handled in accordance with their handling guidelines. For example, while material, e.g., packages 203, are being handled, the proposed system 100 use thermal camera and other camera feeds to identify if there is any human touch, and which objects were in the proximity. There can be a smart contact rule to identify if any area is contaminated, like with human touch, presence of bad smell, dirty items, etc. Based on the smart contact rule, the proposed system will be identifying if any object/item is contaminated, or, if there is any human touch involved.

Referring to FIG. 3, the system 100 to track the packages, and determine whether the protocols for proper handling are followed may include a package handling confirmation engine 105 that employs a convolutional neural network, e.g., region-based convolutional neural network (RCNN) 105a, that works with the IOT sensors 210, 213 to confirm proper handling of the packages 203. The package handling confirmation engine 105 can perform the functions for block 5 of the method depicted in FIG. 2.

The RCNN is a type of artificial neural network. One element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process.

Figure 4:
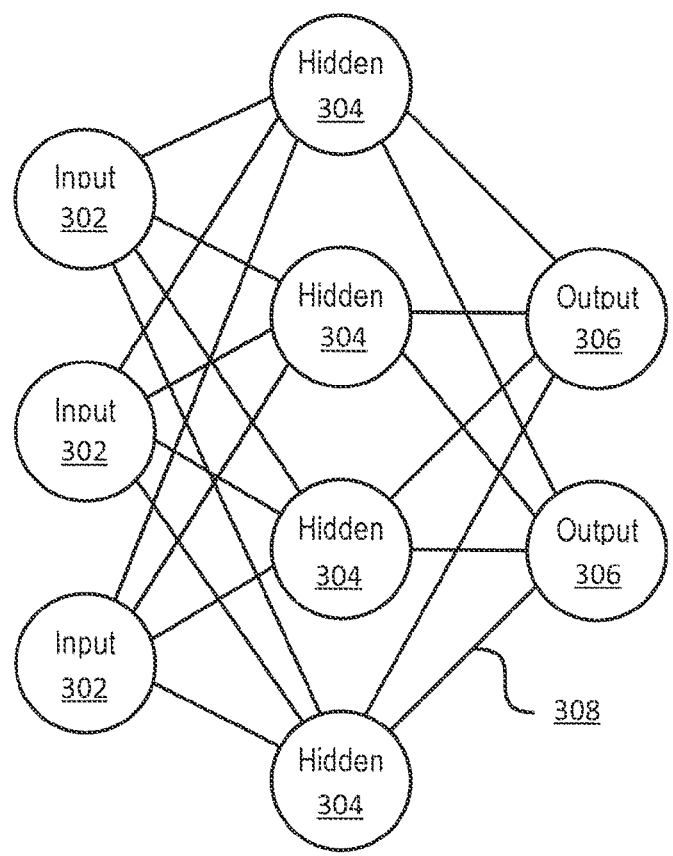
FIG. 4 is a generalized diagram of a neural network.

Referring now to FIG. 4, a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 302 that provide information to one or more "hidden" neurons 304. Connections 308 between the input neurons 302 and hidden neurons 304 are weighted, and these weighted inputs are then processed by the hidden neurons 304 according to some function in the hidden neurons 304. There can be any number of layers of hidden neurons 304, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 306 accepts and processes weighted input from the last set of hidden neurons 304.

This represents a "feed-forward" computation, where information propagates from input neurons 302 to the output neurons 306. Upon completion of a feed-forward computation, the output is compared to a desired output available from training data. The error relative to the training data is then processed in "backpropagation" computation, where the hidden neurons 304 and input neurons 302 receive information regarding the error propagating backward from the output neurons 306. Once the backward error propagation has been completed, weight updates are performed, with the weighted connections 308 being updated to account for the received error. It should be noted that the three modes of operation, feed forward, back propagation, and weight update, do not overlap with one another. This represents just one variety of ANN computation, and that any appropriate form of computation may be used instead. In the present case the output neurons 306 provide analysis of whether a package has been handled correctly according to the data provided from the input of the IoT sensors.

To train an ANN, training data can be divided into a training set and a testing set. The training data includes pairs of an input and a known output. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted. In some embodiments, the streaming plan generator 303 trains to match search items extracted from definitions for requirements used in the requirement management tool to source code that is stored in repositories.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 308 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs. Alternatively, the weights 308 may be implemented as resistive processing units (RPUs), generating a predictable current output when an input voltage is applied in accordance with a settable resistance.

The ANN depicted in FIG. 4 may be employed in the region-based convolutional neural network (RCNN) 105a of the package handling confirmation engine 105. The package handling confirmation engine 105 can track the mobility of packages, handling of package, and will proactively and re-actively be identifying which package might be contaminated or might not be contaminated. If it is found that a package 203 is contaminated, the package handling confirmation engine 105 can then work through the system 100 in sending notification to the transportation system 207, and/or manual loaders/material handling equipment (MHE) to stop handling the packages, (e.g, or place them aside). Referring to FIG. 2, at block 6, the method may continue with informing the parties within the supply chain 200 of a package 203 that has not been handled in accordance with procedures to stop the spread of a pathogen 204.

In some embodiments, the package handling confirmation engine 105 will first check to see if a package 203 has been contaminated. Following contamination, the package handling confirmation engine 105 can also check if decontamination 212 steps have also been performed 212. This is consistent with the type of package 203 as identified by the system, and the proper handling instructions matched by the system 100 to the type of package 203. In some embodiments, a blockchain ledger, e.g., block chain memory 211, will be tracking every step of package handling and accordingly be capturing if every stage is contamination free. In some embodiments, to provide a ledger that is immutable blockchain memory is applied. A "blockchain" is a growing list of records, called blocks, which are linked using cryptography. In some examples, each block contains a cryptographic hash of the previous block, a timestamp, and transaction data (generally represented as a Merkle tree).

Referring back to FIGS. 1-3, the IOT enabled system 100 around the handling areas (also referred to as gripping areas) of the supply chain 200 of the MHE can identifying if the gripping area is contaminated. If the gripping area is contaminated, and said MHE grips any product, then the product will be considered contaminated. For example, if a person is handling the product in the supply chain 200 and/or a machine handles any product in the supply chain 200 and there is a potential contamination without applying any decontamination steps, then the IoT enabled system will identify the product 203 as contaminated at the next stage like packaging and loading (in the delivery vehicle). For example, in FIG. 1, the delivery vehicle identified by reference number 207a was scheduled to receive a package 203 that has been identified as potential contaminated, and was not decontaminated, the system 100 sends a signal to the delivery vehicle 207a to stop the vehicle from starting. This stops the delivery of the contaminated package 203.

Referring to FIG. 2, at block 6, the method can continue with informing parties within supply chain 200 of packages that have not been handled in accordance with requirements to stop the spread of pathogens.

In some embodiments, if manual handling is performed, manual handling will be analyzed to see if the worker is wearing IoT enabled mask and hand gloves 213. The IoT sensors 210, 213 will track the package 203 handled without any mask or hand gloves, and accordingly will be identifying the package 203 as being contaminated. The system 100 also is tracking if proper decontamination 212 is applied on the mask or hand gloves 213 before handling of the product.

In one embodiment, the transportation vehicle 207a will not start if the packages 23 loaded into the vehicle include packages 203 that are contaminated. In this example, the system 100 sends a signal that disables the starter to the motor vehicle. Referring to FIG. 3, the system 100 for reducing cross contamination or the spread of pathogens 204 can include an output 42. The output 42 can be in communication wirelessly with the vehicles 207 for transport. In scenarios, in which the packages 203 loaded onto the vehicles are not contaminated, the system 100 does not send a disabling signal, and the vehicles may be driven towards their delivery destination in the supply chain 200. For example, the long distance transportation vehicles 207 may continue towards motorized man delivery 208, man delivery 209 or an unmanned type delivery, such as drones 205. The system continues to monitor the supply chain 200 to ensure that the packages 203 are property handled at the stages of motorized man delivery 208, man delivery 209 and/or unmanned delivery, e.g., drone type delivery 205.

In some embodiments, vehicles, e.g., the vehicle 207a disabled for containing contaminated packages 203 loaded therein, can be started, if any package that has been identified as contaminated, is removed from the disabled vehicle 207a or is treated for decontamination, e.g., by decontamination steps 212. Upon removal or decontamination of the contaminated packages 203, a signal from the system 100 can be sent to the previously disabled vehicle to reactivate the vehicle. For example, a previously disabled ignition or started system, can have its functionality restored.

As noted above, deep learning will be used in combination with video/image analysis for determining potential handling that can result in contamination, as well as potential decontamination steps. This can be instituted at every stage of delivery. This can be achieved through integration between IoT servers belonging to the smart vehicle and the smart premise (where product and product components have been handled). In some instances, IoT enabled system connected with smart city system will recommend appropriate contamination free roads, so that during transportation the vehicle or delivery products are not contaminated. In some embodiments, while the product, e.g., packages 203, is being handled or kept idle, the IoT enabled system 100 will be tracking if human or any animal/birds has performed mobility around the area, (with thermal camera). More specifically, the system will continue to track the stationary package 203 to determine if anything is coming into contact with the stationary package 203. The IoT sensor feed received at the IoT sensor interface 102 can be analyzed to identify the proximity objects and the possible distances. The proposed system 100 can identify if any device or material handling device is contaminated, because of human touch or because of animal/birds etc. that travelled through a contaminated area, and then into direct contact with or close proximity to, the stationary package 203. Based on the rule defined, e.g., with data provided by the Artificial intelligence (AI) based product classification engine 103, and executed by the package handling confirmation engine 105, the system 100 for reducing cross contamination can establish if any product or product component got contaminated, and can identifying be applying appropriate lock in the device so that it does not create further cross contamination.

Referring to FIG. 1, in some embodiments, in addition to the system 100 for preventing cross contamination providing an output 42 that disables elements of the supply chain 200, the output 42 may also send messages to the customers of the products within the packages 203 being shipped. For example, while receiving the product, the customer can visualize if the product is to be received is free from contamination, and accordingly can accept or reject the delivery. This can be accomplished through the user's device 215, e.g., a user's mobile device, such as smart phone or tablet computer, or a user's non-mobile device, e.g., desktop computer.

The methods, systems and computer program products described herein, can be employed by logistics companies handling B2C shipments whereby the end-to-end supply chain is transparent in terms of providing real time and data transparency regarding tracking of the shipment and physical handling at all transport nodes from start of packing the shipment till door delivery at customer premises.

In some instances, for the end customer the methods, systems and computer program products described herein can be significant and act similar to a health pass to accept the packages post the disinfection verification using their own mobile application to confirm the sanctity of the verification of packages, and decide whether receiving the tracked packages, or auto rejecting the tracked packages, or with advice of receiving same after following steps of disinfection process and revalidation.

For the carriers/retailers/automobile agents the methods, systems and computer program products described herein can serve as a value-added service to their customers, by provided verified disinfected package information.

It is noted that the above example depicted in FIG. 1 represents shipments of products through a shipping supply line 200, e.g., shipping products from manufacturing facilities and/or warehouses to customers purchasing the products. The methods, systems and computer program products are not limited to only this example.

In another application, the system for reducing cross contamination 100 may be applied to hospitals having infectious disease center. Users entering the infectious disease center must wear protective gear when entering the room. As they leave, the protective gear is put in a special room. The system for reducing cross contamination 100 may be applied to this scenario.

In yet another hospital application, an orderly may be pushing a gurney through the halls. In this application, the system for reducing cross contamination 100 send instructions to augmented reality (AR( ) glasses worn by the orderly to instruct the orderly to clean the gurney cleaned prior to bringing it back to another portion of the hospital, such as the emergency room (ER), for the next patient.

The system for reducing cross contamination 100 may also be applied to the food preparation/restraint industry. For example, as food is delivered and prepared, the trays are tagged with RFID tags, and their movement is tracked to make sure that cold and hot plates are not stored together. The status of the cold and hot plates can be tracked using a set of AR glasses in combination with the system for reducing cross contamination 100, as described in FIG. 1. In this example, when one tray is put in the wrong location, all of the trays in that location are flagged in the augmented reality setting as red until they are disposed of and put through a dishwasher.

FIG. 3 is an illustration depicting one embodiment of a system 100 for preventing cross contamination and/or propagation of pathogens during package delivery. In one embodiment, the system 100 for preventing propagation of pathogens includes a hardware processor 13; and a memory 14 that stores a computer program product, which, when executed by the hardware processor, causes the hardware processor to configure internet of things (IoT) sensors along a supply chain of package; and analyze the packages in the supply chain using the IoT sensors to determine handling requirements of the products within the package. The system 100 can also track the packages with a package handling confirmation engine including a Region Based Convolutional Neural Network (RCNN) to determine with the IoT sensors measuring interactions with the packages that parties in the supply chain are handling the packages in accordance with the handling requirements; and stop product distribution through the supply chain in response to the interactions with the packages failing to meet the handling requirements.

Figure 5:
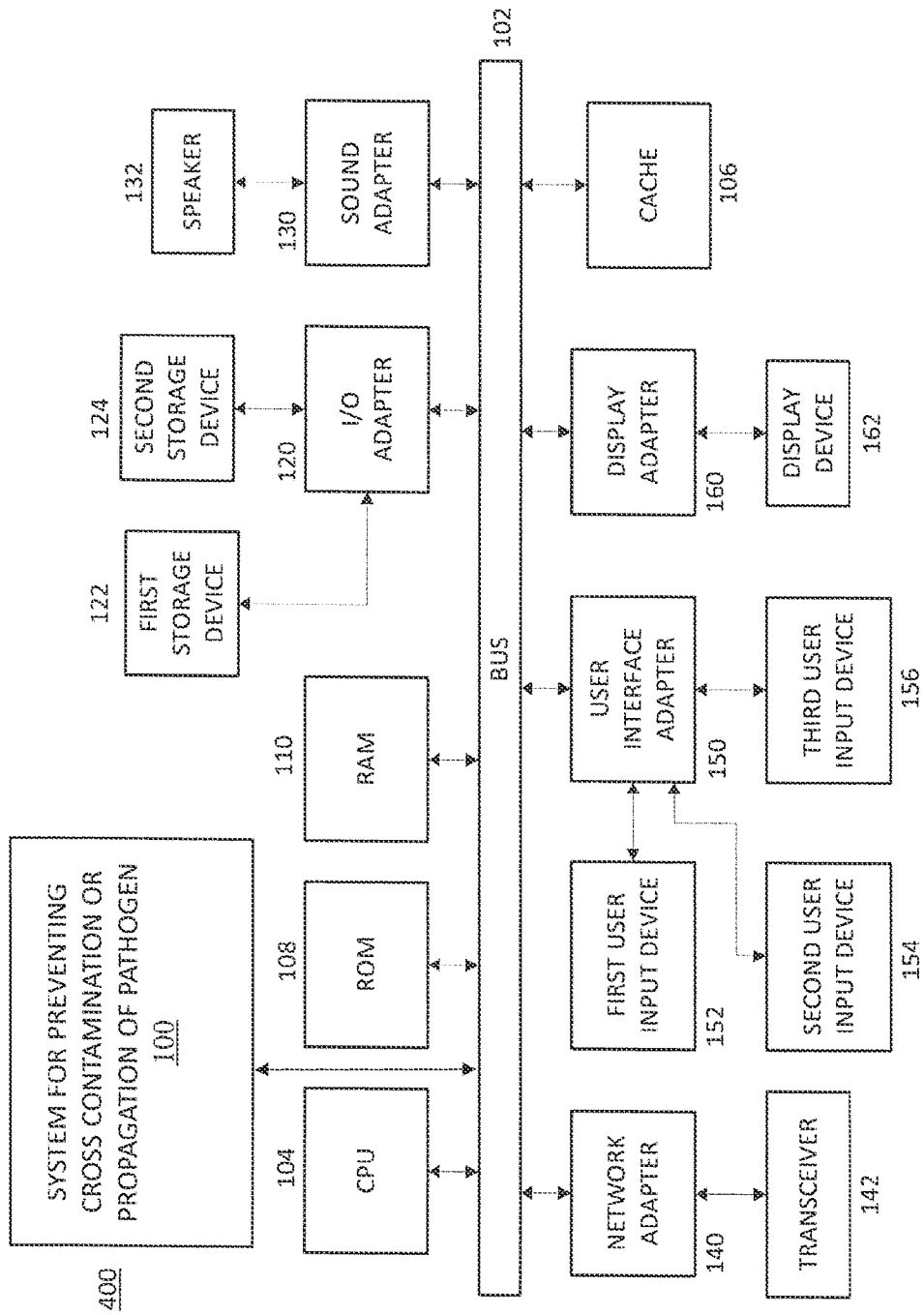
FIG. 5 is a block diagram illustrating one embodiment of a system for preventing cross contamination and/or propagation of pathogens, in accordance with an embodiment of the present invention.

FIG. 5 illustrates a processing system 400 used by or comprised by the system 100 of FIG. 3 for reducing cross contamination, in accordance with the methods and systems described above in FIGS. 1-3. The bus 102 interconnects the plurality of components for the system 100 described above with the components depicted in the computer system 400 depicted in FIG. 5.

The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The processing system 400 depicted in FIG. 5, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400, which can include the system 100 for reducing cross contamination.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

While FIG. 5 shows the computer system 400 as a particular configuration of hardware and software, any configuration of hardware and software, as would be known to a person of ordinary skill in the art, may be utilized for the purposes stated supra in conjunction with the particular computer system 100 of FIG. 4. For example, the memory devices 94 and 95 may be portions of a single memory device rather than separate memory devices.

The present invention may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

In one embodiment, the present disclosure provides a non-transitory computer readable storage medium that includes a computer readable program for identifying the status of object within a region. The non-transitory computer readable program when executed on a computer causes the computer to perform the steps of designating at least one piece of equipment to be tracked; recording a history for the piece of equipment; and detecting when the piece of equipment is present within a region having a set of object restrictions. The non-transitory computer readable program when executed on a computer also causes the computer to perform the steps of comparing the set of object restrictions for the region to the history that is recorded for the piece of equipment that is present in the region to calculate a placement score with a hardware processor that indicates whether the history of the equipment is a match for the region that the equipment is present in; and projecting a sensory signal to the equipment in an augmented reality setting, the sensory signal indicating whether the history of the equipment is a match for the region that the equipment is present in.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment (e.g., Internet of thing (IOT)) now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Figure 6:
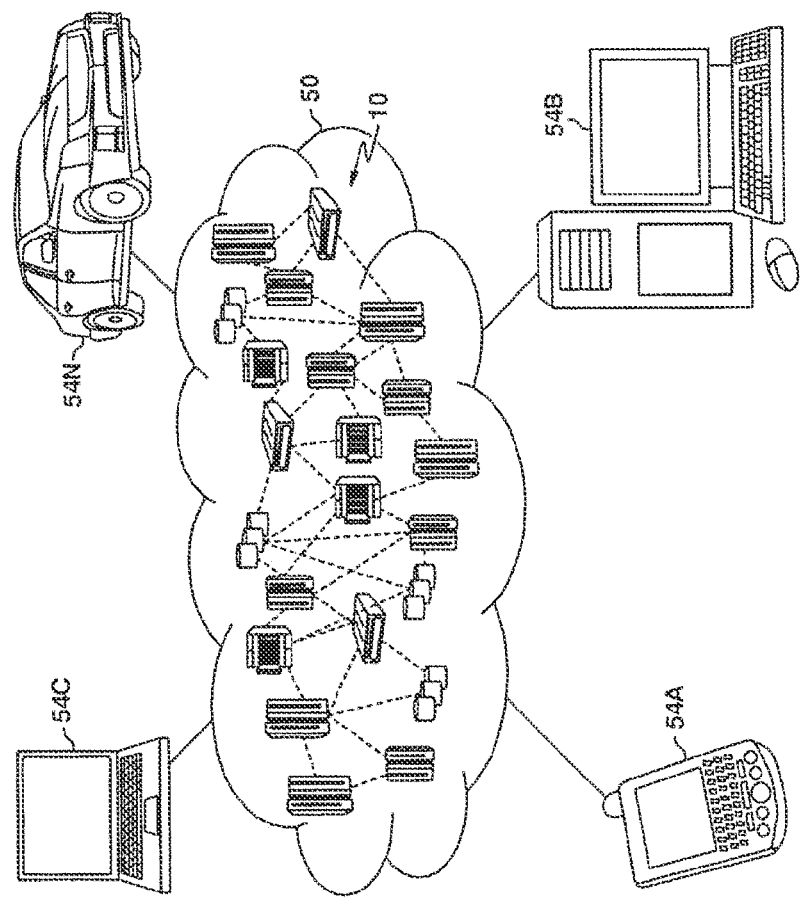
FIG. 6 depicts a cloud computing environment according to an embodiment of the present disclosure.

Referring now to FIG. 6, illustrative cloud computing environment is depicted. As shown, cloud computing environment includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 7:
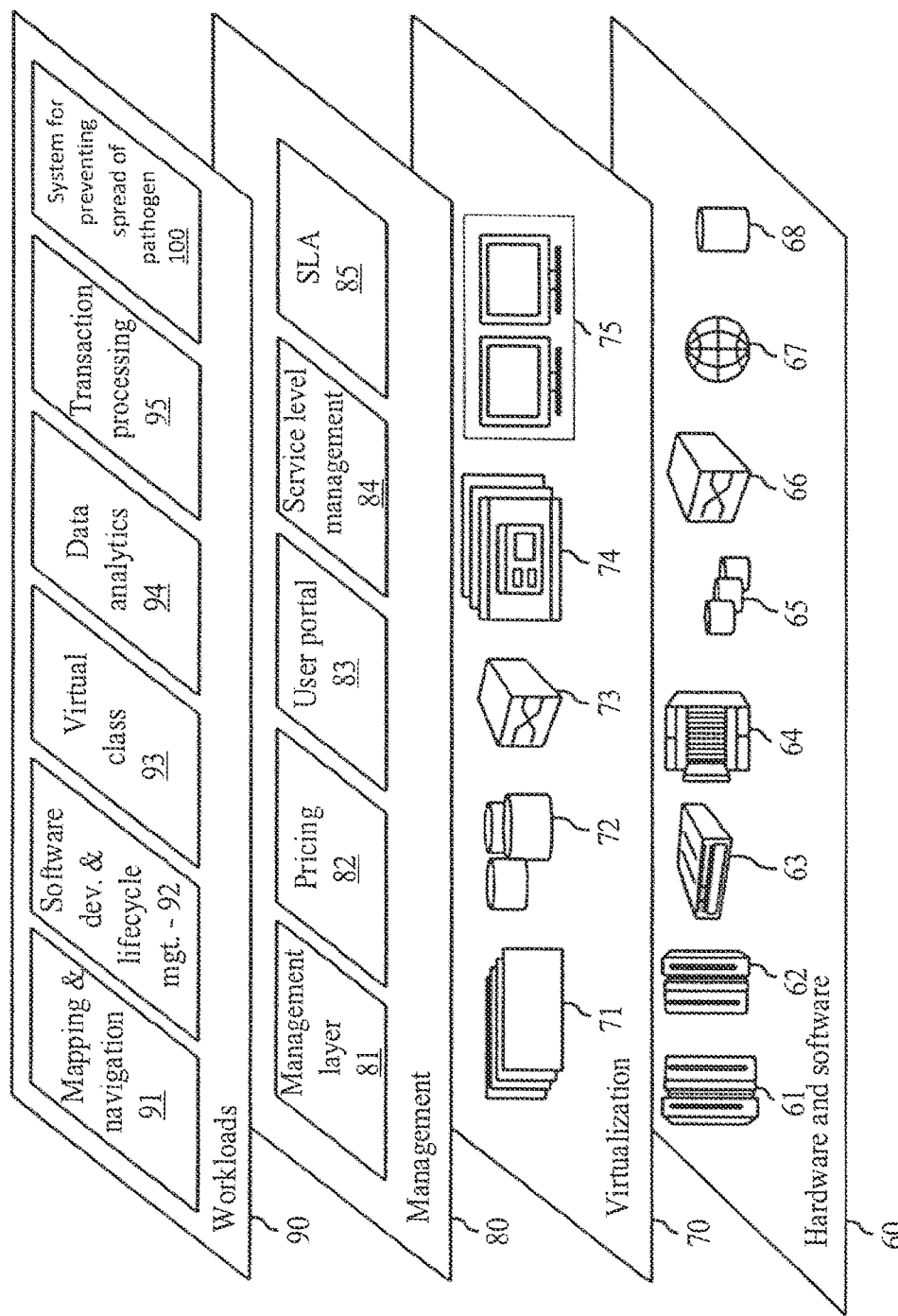
FIG. 7 depicts abstraction model layers according to an embodiment of the present disclosure.

Referring now to FIG. 7, a set of functional abstraction layers provided by cloud computing environment (see FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators.

Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 89 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for a cognitive recognition model to maximize the business impact 96 in hardware devices in accordance with FIGS. 1-7.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method for analysis of handling parameters comprising:
    configuring internet of things (IoT) sensors along a supply chain of packages;
    analyzing the packages in the supply chain using the IoT sensors to determine handling requirements of the products within the packages;
    tracking the packages with a package handling confirmation engine including a Region Based Convolutional Neural Network (RCNN) to determine with the IoT sensors incorporated into the material handling equipment at each stage of delivery through the supply chain, the IOT sensors measuring interactions with the packages that parties in the supply chain are handling the packages in accordance with the handling requirements and that the environment that the packages experience at each stage of delivery through the supply chain is in accordance with the handling requirements;
    stopping product distribution through the supply chain in response to the interactions with the packages failing to meet the handling requirements, wherein packages failing to meet handling requirements are designated as contaminated;
    treating packages designated as contaminated with infrared treatment for decontamination to provide decontaminated packages; and
    returning the decontaminated packages to the supply chain.

2. The computer-implemented method of claim 1, further comprising delivery of the decontaminated packages to a shipping destination.

3. The computer-implemented method of claim 1, wherein the internet of things (IoT) sensors include cameras.

4. The computer-implemented method of claim 1, wherein stopping product distribution includes sending a wireless signal to a shipping vehicle to prevent the shipping vehicle from being started.

5. The computer-implemented method of claim 1, wherein the tracking of the packages with the package handling confirmation engine includes recording the interactions with the packages in blockchain memory.

6. The computer implemented method of claim 1 further comprising sending a report to the recipient of the package of the interactions with the packages that do not meet the handling requirements.

7. The computer implemented method of claim 1, wherein the analyzing of the packages in the supply chain using the IoT sensors to determine handling requirements of the products within the packages includes machine vision in combination with comparison to a database of historical handling requirements.

8. A system for analysis of handling parameters comprising:
 a hardware processor; and
 a memory that stores a computer program product, which, when executed by the hardware processor, causes the hardware processor to:
 configure internet of things (IoT) sensors along a supply chain of packages, wherein the IoT sensors are incorporated into material handling equipment at each stage of delivery through the supply chain;
 analyze the packages in the supply chain using the IoT sensors to determine handling requirements of the products within the packages;
 track the packages with a package handling confirmation engine including a Region Based Convolutional Neural Network (RCNN) to determine with the IoT sensors measuring interactions with the packages that parties in the supply chain are handling the packages in accordance with the handling requirements and that the environment that the packages experience at each stage of delivery through the supply chain is in accordance with the handling requirements;
 stop product distribution through the supply chain in response to the interactions with the packages failing to meet the handling requirements, wherein packages failing to meet handling requirements are designated as contaminated;
 treat packages designated as contaminated with a chemical treatment for decontamination to provide decontaminated packages; and
 return the decontaminated packages to the supply chain.

9. The system of claim 8, further comprising delivery of the decontaminated products to a shipping destination.

10. The system of claim 8, wherein the internet of things (IoT) sensors include cameras.

11. The system of claim 8, wherein stopping product distribution includes sending a wireless signal to a shipping vehicle to prevent the shipping vehicle from being started.

12. The system of claim 8, wherein the tracking of the packages with the package handling confirmation engine includes recording the interactions with the packages in blockchain memory.

13. The system of claim 8 further comprising sending a report to the recipient of the package of the interactions with the packages that do not meet the handling requirements.

14. The system of claim 8, wherein the analyzing of the packages in the supply chain using the IoT sensors to determine handling requirements of the products within the packages includes machine vision in combination with comparison to a database of historical handling requirements.

15. A computer program product for analysis of handling parameters comprising a computer readable storage medium having computer readable program code embodied therewith, the program instructions executable by a processor to cause the processor to:
 configure, using the processor, internet of things (IoT) sensors along a supply chain of packages, wherein the IoT sensors are incorporated into material handling equipment at each stage of delivery through the supply chain;
 analyze, using the processor, the packages in the supply chain using the IoT sensors to determine handling requirements of the products within the packages;
 track, using the processor, the packages with a package handling confirmation engine including a Region Based Convolutional Neural Network (RCNN) to determine with the IoT sensors measuring interactions with the packages that parties in the supply chain are handling the packages in accordance with the handling requirements and that the environment that the packages experience at each stage of delivery through the supply chain is in accordance with the handling requirements;
 stop, using the processor, product distribution through the supply chain in response to the interactions with the packages failing to meet the handling requirements, wherein packages failing to meet handling requirements are designated as contaminated;
 treat, using the processor, packages designated as contaminated with infrared treatment for decontamination to provide decontaminated packages; and
 return, using the processor, the decontaminated packages to the supply chain.

16. The computer program product of claim 15, further comprising delivery of the decontaminated packages to a shipping destination.

17. The computer program product of claim 15, wherein the internet of things (IoT) sensors include cameras.

18. The computer program product of claim 15, wherein stopping product distribution includes sending a wireless signal to a shipping vehicle to prevent the shipping vehicle from being started.

19. The computer program product of claim 15, wherein the tracking of the packages with the package handling confirmation engine includes recording the interactions with the packages in blockchain memory.

20. The computer program product of claim 15 further comprising sending a report to the recipient of the package of the interactions with the packages that do not meet the handling requirements.

* * * * *